E. H. MESSITER.
WEIGHING MECHANISM.
APPLICATION FILED JUNE 14, 1911.

1,104,268.

Patented July 21, 1914.
3 SHEETS—SHEET 1.

WITNESSES:

INVENTOR

BY

ATTORNEYS

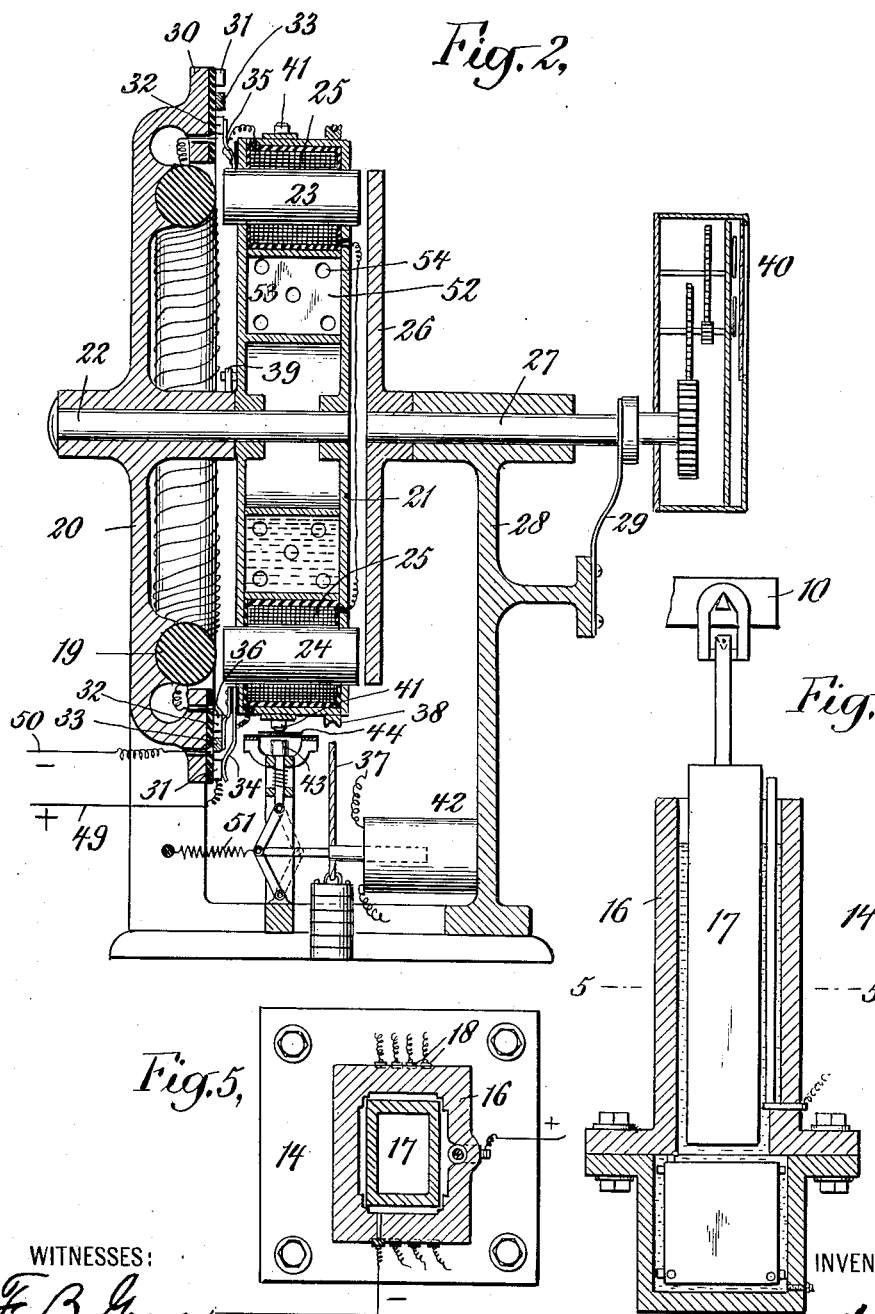

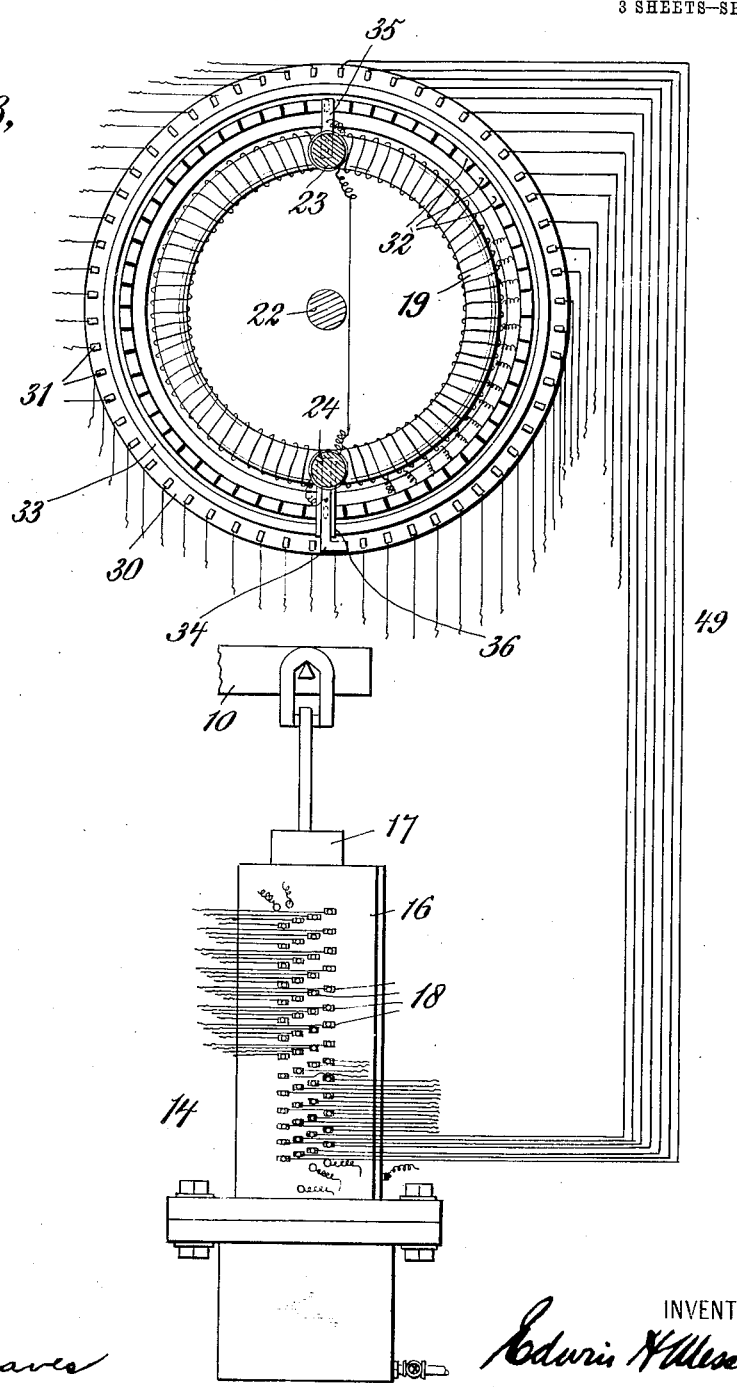

UNITED STATES PATENT OFFICE.

EDWIN H. MESSITER, OF BROOKLYN, NEW YORK, ASSIGNOR TO WEIGHER PATENT COMPANY, OF NEW YORK, N. Y., A CORPORATION OF NEW YORK.

WEIGHING MECHANISM.

1,104,268.  Specification of Letters Patent.  Patented July 21, 1914.

Application filed June 14, 1911. Serial No. 633,056.

*To all whom it may concern:*

Be it known that I, EDWIN H. MESSITER, a citizen of the United States of America, and a resident of Brooklyn, county of Kings, and State of New York, have invented certain new and useful Improvements in Weighing Mechanism, of which the following is a specification, reference being had to the accompanying drawings, forming a part thereof.

My invention relates to weighing mechanism, and particularly to means employed in connection with stationary scales for electrically weighing a load, and for recording and registering a succession of weight indications.

The main object of my invention is to provide an inexpensive, efficient and accurate weighing mechanism in which the entire operation of weighing and registering or recording is accomplished without manual manipulation of moving parts; and to the end that my invention may be fully understood, I will now describe an embodiment thereof, having reference to the accompanying drawings illustrating the same, and will then point out the novel features in claims.

Figure 1:
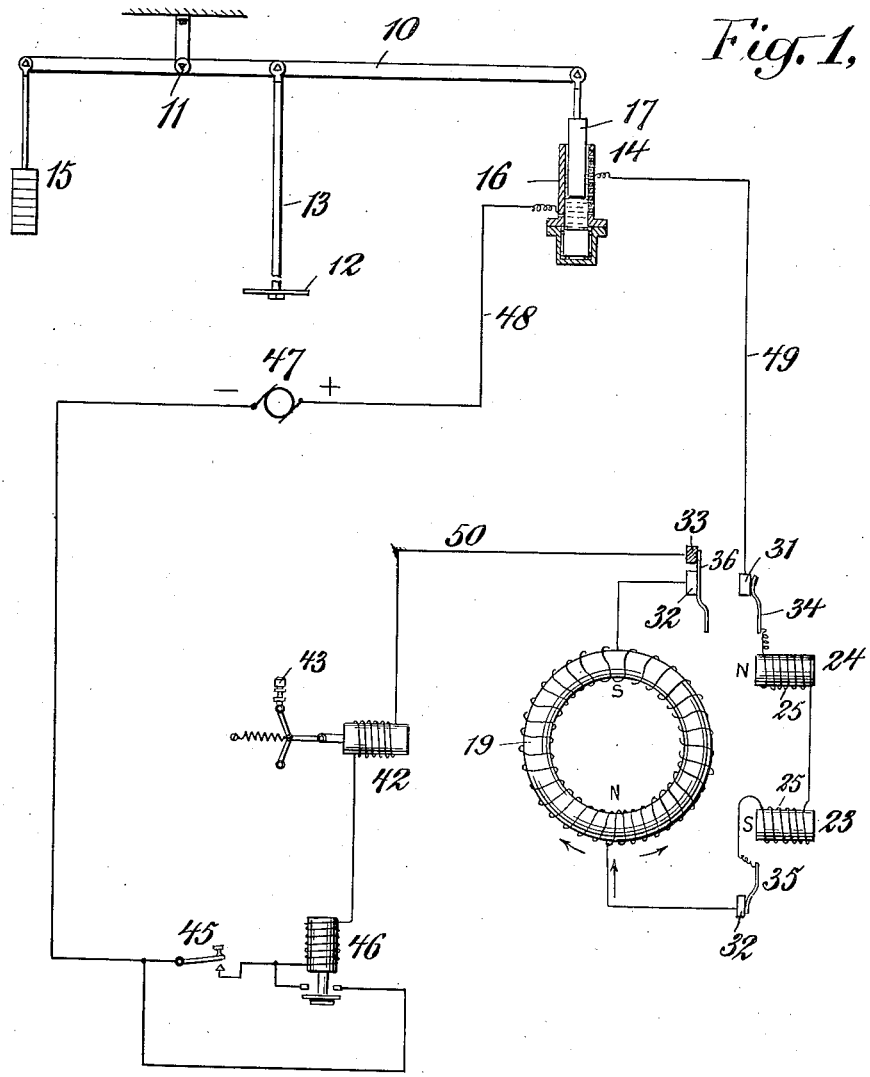
Figure 6:
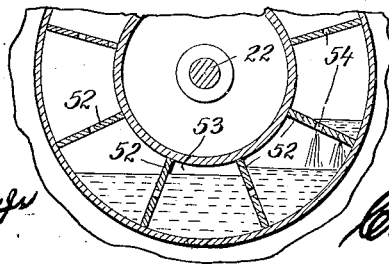

In the drawings: Figure 1 is a diagrammatic view of weighing mechanism constructed in accordance with my invention, showing particularly the electric circuits employed. Fig. 2 is a view in partial side elevation and partial central vertical longitudinal section of a novel form of electric motor employed therein and of certain parts connected therewith. Fig. 3 is a somewhat diagrammatic view showing a portion of the motor in transverse section, and a plunger device in side elevation. Fig. 4 is a view in central vertical section through the plunger device. Fig. 5 is a view in horizontal transverse section through the plunger device. Fig. 6 is a detail view in vertical transverse section through a portion of the field magnet of the motor showing the means employed therein for preventing overthrow.

The weighing scales themselves are shown in the drawings purely diagrammatically, being represented in Fig. 1 by a beam 10 fulcrumed at 11 to a stationary support, a platform 12 suspended from the beam 10 by a link 13, a plunger device 14 at the extremity of the lever 10 upon the same side of its fulcrum as the support for the platform 12, and a counterbalance 15 connected at the other end of the scales lever for counterbalancing the permanent load. The plunger device 14 (see also Figs. 3, 4 and 5) includes a vessel 16 in which mercury or analogous fluid is contained, and a plunger 17, the upper end of which is connected to the scale beam 10 and the lower end of which is immersed in the mercury. A load upon the platform 12, such as is to be weighed, will depress the plunger end of the scale beam lever 10, forcing the plunger 17 down into the mercury and hence causing the mercury to rise around the plunger to a proportionate degree. The plunger device will in this respect take the place of the usual poise used in ordinary weighing machines, the weight of the mercury displaced, multiplied by the lever ratio, being equal to and constituting a balance for the load being weighed.

The walls of the vessel 16 contain a number of terminals 18 which penetrate to the interior of the vessel into position for contact with the electrically conductive mercury as the same rises in the vessel under the influence of a load being weighed, and as these terminals are disposed progressively in a vertical direction it will follow that the number of them that are reached at any time by the mercury will be in direct proportion to the load being weighed. In view of this it only remains to move some part in proportion to the number of the terminals thus closed and to utilize this movement for indicating, recording or registering the load, to the end that a simple and accurate weighing instrument will result. For this purpose I have provided a device which may be termed for the purposes of the present specification, an electric motor (see particularly Fig. 2 and the upper part of Fig. 3). This electric motor comprises a stationary armature 19 secured fast to a suitable standard 20, and a revoluble field magnet comprising a frame 21, a shaft 22 therefor rotatably mounted in the said standard 20 concentric to the armature 19, and two soft iron cores 23—24 surrounded by windings 25 in series with each other. Just to the rear of these field cores is a disk 26 whose shaft 27 is journaled coaxially with the shaft 22, in a standard 28. This disk is composed of a suitable magnetic metal and when the coils 25 are energized as will presently be explained, will be attracted into contact with the cores 23—24 against the resistance of a light spring 29, tending to force it into the opposite direction. In thus coming into contact with the cores, the disk will not only form one member of a magnetic clutch so that the shafts 22 and 27 will then be caused to rotate together, but it will also constitute a yoke for magnetically connecting the two cores 23 and 24 together, whereby the magnetic field established thereby will be enormously increased, as will be well understood.

The standard 20 is provided with a ring piece 30 upon which are arranged two concentric sets of contact terminals 31—32, the terminals of the outer set 31 being connected electrically in succession with the successive contact terminals in the mercury vessel 18, while the terminals of the inner set 32 are connected electrically with segments of the stationary armature winding 19, constituting in effect a commutator therefor. A continuous contact ring 33 is disposed between the two sets of terminals 31—32, as shown. The field magnet carries a brush 34 for engagement with the terminals 31 of the outer set, another brush 35 arranged diametrically opposite to the first said brush 34, for engagement with the terminals of the inner set, and a third brush 36 arranged for simultaneous engagement with the terminals 32 of the inner set and the intermediate contact ring 33 these brushes serving to complete a circuit through the armature and field magnet as presently will be shown. It will be readily seen that if current be passed through the coils 25 of the field magnet 21, and also in the proper direction through the armature ring, so that the poles thereof are in advance, rotatively speaking, of the cores 23—24, the magnetic torque thereby instituted will cause the field magnet to rotate in the direction of such advance and that the rotation will continue for so long a time as the poles of the armature thus instituted are maintained rotatively in advance of the cores, but that such rotation will cease directly the circuit is broken.

The field magnet is provided with suitable means for returning it after each operation to a normal position and for purposes of this specification I have shown the means as comprising a cord and weight 37, the former surrounding a grooved ring 38 carried by the field magnet, the field magnet being brought to rest against a suitable stop 39 as will be well understood.

The shaft 27 of the disk 26 may be connected to a suitable registering or recording device such for instance as a simple counter 40 (see Fig. 2). If the counter or similar form of registering device be used and it is desired to retain a permanent record of individual weighing operations, the field magnet may carry a set of printing figures 41 having the proper angular position thereon to correspond with the weight being registered for any particular position of the field magnet, an electromagnetic device 42 being provided to operate a plunger 43 for printing a record therefrom upon a strip 44. The inking mechanism and the feeding movement for the strip are not shown in detail herein as forming no part *per se* of the present invention, any well known or desired form of printing mechanism being equally adapted for use in this connection.

Referring to Fig. 1, a circuit closer 45 is shown as provided in the electric circuit, together with a series relay 46 for holding the circuit closed after the circuit closer 45 has been closed and opened again, and until the circuit is broken elsewhere.

The operation is as follows: A load having been placed upon the platform 12 and the plunger 17 thereby depressed so that the mercury will rise to the proper level, the circuit closer 45 is operated to momentarily close circuit. The circuit may be now traced from the positive side of a generator 47 through a wire 48 (see Fig. 1) to the mercury in the mercury vessel 16; thence the current may flow through any of the terminals 18 in the mercury vessel which are at the time closed by the mercury, and through wires 49 which connect them with the outer ring of contact points 31. In the normal rest position of the armature 21 the brush 34 will be resting upon the first of the contact points 31 which connects with the contact terminal 18 that is first electrically reached by the mercury in the vessel 16 at the commencement of the descent of the plunger 17, and the contacts 31 which successively follow this contact thus in contact with the brush 34, in the direction of rotation of the field magnet opposite to that in which it is rotated by the cord and weight 36, will be those which are successively reached electrically by the mercury as it rises upon the further descent of the plunger, so that if in the rising of the mercury ten of the terminals 18 are reached by the mercury and are so placed in electrical connection with the lead wire 48, so ten of the contact points 31 will be "live" at the time. The brush 34 is electrically connected with one end of the coil 25 around the core 24, the other end of the said coil passing to the coil around the core 23, the opposite end of the latter coil passing to the brush 35 which it will be remembered rests upon a contact point 32 of the inner set. The current now passes to the armature 19 and divides, (as shown in Fig. 1), passing in opposite directions to the diametrically opposite contact point 32 which is engaged by the brush 36. The current then passes through the brush 36 to the continuous contact ring 33 and thence to the return wire 50. Thence the current passes through the printing magnet 42 and the series relay 46, (or the key 45), back to the generator 47. In the rest position of the parts the brushes are arranged to engage such of the contact points, that when the first terminal 18 is closed the magnetic torque established will be sufficient to move the field magnet through a single unit of movement represented angularly by the distance between two of the outer contact points 31, but no more, so that if but one of the terminals 18 is closed the armature will move to a degree sufficient to carry the brush from one contact point 32 to the next and no farther. If, however, by reason of the fact that the mercury has risen sufficiently to cover the next point, or say ten points, then as each new point is reached so circuit will be again established in such a way as to continue the magnetic torque until the field magnet has moved angularly through ten units of space. Thus it will be seen that the amount of angular movement of the armature at any weighing operation is directly proportionate to the number of contact terminals 18 closed by the mercury as has been above stated.

At the moment the circuit above mentioned was established the cores 23 and 24 were caused to become magnets and so attracted the armature disk 26 thereto, whereupon the yoke connection thus formed converted them from individual electro-magnets of small magnetic value into a signal electromagnet of considerable power. The rotative movement of the field magnet will not commence until the considerable magnetic field is thus established so that there is no danger of the field magnet starting to move until the disk is engaged thereby. When in engagement it is held thereto by the magnetic force as before mentioned, and in the rotation of the field magnet under the influence of the magnetic torque, the shaft 27 will rotate with the shaft 22 and the registering device 40 will be operated. When the current is first closed the printing magnet 42 is also operated but as in the zero position there will be no printing point 41 in line with the plunger 34, the only effect would be to idly reciprocate the plunger 43, the parts moving to the position shown in dotted lines in Fig. 2 against the resistance of a spring 51. When, however, the field magnet reaches the limit of its movement under electro-magnetic influence and the circuit is broken by the brush 34 reaching a "dead" point 31, the following takes place. First, the disk 26 is released and moves away from the cores 23—24 under the influence of the spring 29; second, the electro-magnetic device 42 is deënergized and the spring 51 causes a reciprocation of the plunger 43 to print a record upon the strip 44; third, the field magnet is returned to its normal position under the influence of the cord and weight 37. At the moment of the break of current the series relay 46 also releases its armature so that circuit was likewise broken at this point, it being understood that the series relay 46 is employed solely for the purpose of enabling the making a quick make-and-break in the circuit closer 45, the closing of the circuit through the points controlled by the armature of the relay 46 maintaining the circuit closed even after the opening of the circuit closer 45 and until the circuit is broken elsewhere, as will be well understood. The provision for permitting rapid opening and closing of the circuit closer 45 is advantageous both in automatic weighing where closing of the circuit may be momentary, due to its being brought about by a moving part, and in manual weighing where it will obviate the necessity of requiring the operator to do anything more than merely close the circuit momentarily.

In order to prevent accidental overthrow movements of the motor, some damping means may be provided and as a convenient and inexpensive example thereof I have shown the frame portion 21 of the field magnet, as containing an annular chamber 52 partially filled with liquid, the said chamber having a number of transverse baffle or surge plates 53 provided with perforations 54 therein, through which the liquid must flow as the field magnet revolves, in order to establish equilibrium. As the liquid will thus tend to hang back as the field magnet moves it will tend to prevent overthrow, yet as the liquid is permitted to filter through the plates 53 equilibrium is always restored after the field magnet has come to rest.

It will be understood that for simplicity of illustration and description I have shown many of the parts herein in purely diagrammatic form their details of construction being unimportant. With respect to the plunger device 14 reference is made to application Serial Number 576,827 filed August 12, 1910, in which there is a full disclosure of the same.

What I claim is:

1. The combination with weighing means and an electric motor comprising two members movable with respect to each other, one constituting an armature and the other a field magnet, and means therein for advancing the lines of force in the motor, in the movement of one of the said members with respect to the other; of means controlled by the position of the weighing means under the influence of a load for determining the extent of said advance of the lines of force.

2. The combination with weighing means and an electric motor comprising two members movable with respect to each other, one constituting an armature and the other a field magnet, and means for exciting the motor through successive units of advance of one of the said members with respect to the other; of means controlled by the position of the weighing means under the influence of a load for determining the extent of movement through which such excitation shall occur.

3. The combination with weighing means and an electric motor containing two members relatively movable with respect to each other under the influence of a magnetic torque in the motor, of means controlled by the position of the weighing means under the influence of a load for predetermining the extent of movement through which such magnetic torque shall be produced, and causing the termination of the production of such magnetic torque at the end of such movement.

4. The combination with weighing means including a mercury vessel and a plunger for immersion therein, said mercury vessel being provided with a plurality of successively disposed contact terminals, of an electric motor containing a plurality of successively disposed elements each of which represents a unit of advance of the motor, said elements being individually in electric connection with said mercury vessel contact terminals, and an electric generator in circuit with the motor and the mercury vessel.

5. The combination with weighing means including a mercury vessel and a plunger for immersion therein, said mercury vessel being provided with a plurality of successively disposed contact terminals, of an electric motor comprising a relatively rotatable field magnet and armature, a succession of contact terminals therein, and a brush for engagement with said contact terminals successively whereby the lines of force in the motor are successively advanced for each unit of advance of the motor, and means connecting said motor terminals with said mercury contact terminals, whereby as the mercury rises in the vessel said elements will be brought successively into electric connection therewith.

6. The combination with weighing means including a mercury vessel and a plunger for immersion therein, said mercury vessel being provided with a plurality of successively disposed contact terminals, of an electric motor comprising a stationary armature and a succession of contact terminals connected therewith segmentally around the same, and a rotatable field magnet provided with a brush for successive engagement with said armature terminals in its rotation, means connecting the individual armature terminals with the individual mercury vessel terminals, and means for supplying current to a circuit through the mercury vessel, and the armature and the field magnet of said motor.

7. The combination with weighing means and an electric motor comprising two members movable with respect to each other, one constituting an armature and the other a field magnet, means therein for advancing the lines of force in the motor, in the movement of one of the said members with respect to the other; of means controlled by the position of the weighing means under the influence of a load for determining the extent of the said advance of the lines of force, and means for returning the motor to a normal position after each movement of advance thereof.

8. The combination with weighing means and an electric motor comprising two members movable with respect to each other, one constituting an armature and the other a field magnet, means for exciting the motor through successive units of advance of one of the said members with respect to the other; of means controlled by the position of the weighing means under the influence of a load for determining the extent of movement through which such excitation shall occur, and means for returning the motor to a normal position after each movement of advance thereof.

9. The combination with weighing means and an electric motor containing two members relatively movable with respect to each other under the influence of a magnetic torque in the motor; of means controlled by the position of the weighing means under the influence of a load for predetermining the extent of movement through which such magnetic torque shall be produced, and causing the termination of the production of such magnetic torque at the end of such movement, and means for returning the motor to a normal position after each movement of advance thereof.

10. The combination with weighing means, of an electric motor containing a plurality of successively disposed elements each of which represents a unit of advance of the motor, means controlled by the weighing means under the influence of a load for selectively affording electric connection between the weighing means and said elements, and means for returning the motor to a normal position after each movement of advance thereof.

11. The combination with weighing means including a mercury vessel and a plunger for immersion therein, said mercury vessel being provided with a plurality of successively disposed contact terminals; of an electric motor containing a plurality of successively disposed elements each of which represents a unit of advance of the motor, said elements being individually in electric connection with said mercury vessel contact terminals, an electric generator in circuit with the motor and the mercury vessel, and means for returning the motor to a normal position after each movement of advance thereof.

12. The combination with weighing means including a mercury vessel and a plunger for immersion therein, said mercury vessel being provided with a plurality of successively disposed contact terminals; of an electric motor comprising a relatively rotatable field magnet and armature, a succession of contact terminals therein, and a brush for engagement with said contact terminals successively whereby the lines of force in the motor are successively advanced for each unit of advance of the motor, means connecting said motor terminals with said mercury contact terminals, whereby as the mercury rises in the vessel said elements will be brought successively into electric connection therewith, and means for returning the field magnet to a normal position after each complete operative movement thereof.

13. The combination with weighing means and an electric motor containing two members relatively movable with respect to each other under the influence of a magnetic torque in the motor; of means controlled by the position of the weighing means under the influence of a load for predetermining the extent of movement through which such magnetic torque shall be produced, and for bringing about the termination of such magnetic torque at the end of such movement, a register, and electro-magnetic means for connecting the same with the motor.

14. The combination with weighing means and an electric motor containing two members relatively movable with respect to each other under the influence of a magnetic torque in the motor; of means controlled by the position of the weighing means under the influence of a load for predetermining the extent of movement through which such magnetic torque shall be produced and causing the termination of the production of such magnetic torque at the end of such movement, means for returning the motor to a normal position after each movement of one of its members under the influence of the magnetic torque, a register, and means connecting the register with the motor in one direction of its movement only.

15. The combination with weighing means and an electric motor containing two members relatively movable with respect to each other under the influence of a magnetic torque in the motor; of means controlled by the position of the weighing means under the influence of a load for predetermining the extent of movement through which such magnetic torque shall be produced and causing the termination of the production of such magnetic torque at the end of such movement, means for returning the motor to a normal position after each movement of one of its members under the influence of the magnetic torque, a register, and electromagnetic means connecting the register with the motor in one direction of its movement only.

16. The combination with weighing means and an electric motor containing two members relatively movable with respect to each other under the influence of a magnetic torque in the motor; of means controlled by the position of the weighing means under the influence of a load, circuits between the motor and said controlled means, said controlled means being arranged to control said circuits to predetermine the extent of movement through which such magnetic torque shall be produced, and causing the termination of such magnetic torque at the end of such movement, and means for recording the successive positions of the said motor at each operation.

17. The combination with weighing means and an electric motor containing two members relatively movable with respect to each other under the influence of a magnetic torque in the motor; of means controlled by the position of the weighing means under the influence of a load, circuits between the motor and said controlled means, said controlled means being arranged to control said circuits to predetermine the extent of movement through which such magnetic torque shall be produced, and causing the termination of such magnetic torque at the end of such movement, and electro-magnetically controlled means for recording the successive positions of the said motor at each operation.

18. The combination with weighing means and an electric motor containing two members relatively movable with respect to each other under the influence of a magnetic torque in the motor; of means controlled by the position of the weighing means under the influence of a load for predetermining the extent of movement through which such magnetic torque shall be produced, and causing the termination of such magnetic torque at the end of such movement, and an electro-magnetically operated printing device operating in conjunction with said motor for recording the successive positions thereof.

19. The combination with weighing means including a mercury vessel and a plunger for immersion therein, said mercury vessel being provided with a plurality of successively disposed contact terminals; of an electric motor comprising a stationary armature and a succession of contact terminals connected therewith segmentally around the same, and a rotatable field magnet composed of two magnetically separated cores, said field magnet carrying a brush for successive engagement with said armature terminals in its rotation, means connecting the individual armature terminals with the individual mercury vessel terminals, means for supplying current to a circuit through the mercury vessel, and the armature and field magnet of said motor, a disk constituting an armature for the separate core pieces of said field magnet, and a register connected to the said disk.

20. The combination with an electro-magnetically operated power element, a register, and a magnetic clutch for connecting the register with said power element; of a weighing device, and means controlled by the weighing device in accordance with a load thereon for determining the extent of movement of the power element.

21. The combination with an electro-magnetically operated power element, a register, and a magnetic clutch for connecting the register with said power element; of a weighing device, means controlled by the weighing device in accordance with a load thereon for determining the extent of movement of the power element in one direction, and mechanical means for returning the power element to a normal position after each operation.

22. The combination with an electro-magnetically operated power element and a register operated thereby, of a weighing device, means controlled by the weighing device in accordance with a load thereon for determining the extent of movement of the power element, a circuit between said controlled means and the power element, a circuit closer in said circuit, and a series relay in electrical connection therewith for maintaining a closed circuit after the opening of the circuit closer and until the circuit is broken elsewhere.

23. The combination with weighing means and an electric motor comprising two members movable with respect to each other, one constituting an armature and the other a field magnet, and means associated with said field magnet for advancing the lines of force in the motor, in the movement of one of the said members with respect to the other; damping means for said motor; of means controlled by the position of the weighing means under the influence of a load for determining the extent of said advance of the lines of force.

24. The combination with weighing means and an electric motor comprising two members movable with respect to each other, one constituting an armature and the other a field magnet, means associated with said field magnet for advancing the lines of force in the motor, in the movement of one of the said members with respect to the other; damping means for said motor; of means controlled by the position of the weighing means under the influence of a load for determining the extent of the said advance of the lines of force, and means for returning the motor to a normal position after each movement of advance thereof.

EDWIN H. MESSITER.

Witnesses:
D. HOWARD HAYWOOD,
LYMAN S. ANDREWS, Jr.